(12) United States Patent
Noé et al.

(10) Patent No.: US 7,909,158 B2
(45) Date of Patent: Mar. 22, 2011

(54) WALKING-BEAM CONVEYOR

(75) Inventors: Andreas Noé, Kerken (DE); Wolfgang Kalbfleisch, Alpen (DE); Herbert Beuther, Duisburg (DE)

(73) Assignee: BWG Bergwerk-und Walzwerk-Maschinenbau GmbH, Duisburg (DE)

( * ) Notice: Subject to any disclaimer, the term of this patent is extended or adjusted under 35 U.S.C. 154(b) by 0 days.

(21) Appl. No.: 12/001,769

(22) Filed: Dec. 12, 2007

(65) Prior Publication Data

US 2008/0164123 A1    Jul. 10, 2008

(30) Foreign Application Priority Data

Jan. 8, 2007   (DE) .................. 10 2007 002 010

(51) Int. Cl.
   *B65G 25/02*   (2006.01)
(52) U.S. Cl. ................ 198/463.3; 198/468.6; 198/774.2
(58) Field of Classification Search .................. 198/774, 198/773, 777
   See application file for complete search history.

(56) References Cited

U.S. PATENT DOCUMENTS

| | | | | |
|---|---|---|---|---|
| 3,249,415 | A | * | 5/1966 | McMaster et al. ............. 65/160 |
| 3,467,239 | A | * | 9/1969 | Roinestad ..................... 198/852 |
| 4,236,626 | A | * | 12/1980 | Noe ........................... 198/468.6 |
| 4,270,655 | A | * | 6/1981 | Noe ........................... 198/774.2 |
| 4,387,800 | A | | 6/1983 | Noe .............................. 198/750 |
| 4,865,180 | A | * | 9/1989 | Brems et al. .............. 198/468.6 |
| 6,640,963 | B2 | | 11/2003 | Lecrivain .................. 198/750.2 |

FOREIGN PATENT DOCUMENTS

| | | |
|---|---|---|
| DE | 1283149 | 11/1968 |
| DE | 29803458 | 7/1998 |

* cited by examiner

*Primary Examiner* — Gene Crawford
*Assistant Examiner* — Kavel Singh
(74) *Attorney, Agent, or Firm* — Andrew Wilford

(57) ABSTRACT

A walking-beam conveyor has a pair of longitudinally extending, parallel, and transversely spaced fixed support rails, at least one walking beam between and generally parallel to the rails, and at least two lifters underneath the walking beam and operable to raise the walking beam from a return position generally below the rails to a conveying position generally above the rails. In accordance with the invention a first longitudinally extensible hydraulic actuator has opposite longitudinal ends one of which is secured relative to the rails. A second longitudinally extensible hydraulic actuator has opposite longitudinal one of which is secured to the other end of the first actuator and the other of which is secured to the walking beam.

14 Claims, 4 Drawing Sheets

US 7,909,158 B2

WALKING-BEAM CONVEYOR

FIELD OF THE INVENTION

The present invention relates to a conveyor. More particularly this invention concerns a walking-beam conveyor.

BACKGROUND OF THE INVENTION

A walking-beam conveyor for the stepped conveyance of metal coils or sheet-metal bundles, sheet packs, or similar conveyed stock typically has at least one walking beam that is raised and lowered by lifters between lateral support rails and is movable by at least one longitudinally effective actuator in the longitudinal transport direction. The sheet-metal or wound-up metal strips are also designated as coils.

Preferably, such a walking-beam conveyor has a plurality of walking beams arranged successively in the workpiece-travel direction that are moved step-wise downstream and upstream jointly. At the same time, the walking beams are jointly raised while moving downstream and lowered while moving back such that the coils or the like resting on the lateral support rails can be conveyed in steps in the workpiece-travel direction. A walking-beam conveyor of this type can be integrated as conveying equipment, for example, in rolling mills. However, they are appropriate for use in all types of rolling plants and processing lines, such as, for example, pickling lines, surface-coating equipment, shearing lines, conveyance systems connecting various equipment, etc. These walking-beam conveyors are characterized by high strength and flexibility. The simple design of the delivery points allows for angled branching from the conveyor line, reversibility, as well as independent feeding and discharging of the coils. Additional advantages of walking-beam conveyors are the modular design and floor-level conveying surface. As a result, these walking-beam conveyors are suitable, for example, for conveying coils, for example, hot coils at the output point of hot-rolling mills. They can be employed both at the intake section (feed for the coils) as well as at the output (removal area for the coils), and are suitable for the conveyance of hot and cold coils.

An example of a walking-beam conveyor of the type described in the introduction was disclosed in U.S. Pat. No. 4,387,800. The longitudinally effective actuator is designed as a cylinder that steps the walking beam downstream and upstream. This patent also describes a walking-beam conveyor in which the travel or beam drive is designed as a toothed rack drive comprising a hydromotor and a drive pinion that engages a toothed rack disposed on the underside of the walking beam.

Walking-beam conveyors of this type are proven technology. In practice, however, it has been found that the transport or conveyance path is limited since the overall load of a plurality of walking beams disposed in succession is very high. This aspect is combined with a relatively expensive construction. For this reason, chain conveyors are in practice frequently employed, in particular for long conveying distances. These chain conveyors are utilized primarily for long conveyor lines and, for example, for hot-coil cooling lines. However, a robust design comparable with walking-beam conveyors cannot be easily achieved with such chain conveyors. This is the starting point for the invention.

OBJECTS OF THE INVENTION

It is therefore an object of the present invention to provide an improved walking-beam conveyor.

Another object is the provision of such an improved walking-beam conveyor that overcomes the above-given disadvantages, in particular that is simple, cost-effective, and at the same time of robust design.

More particularly the walking-beam conveyor according to the invention should be suitable for long conveying lines and be usable in a flexible manner.

SUMMARY OF THE INVENTION

A walking-beam conveyor has according to the invention a pair of longitudinally extending, parallel, and transversely spaced fixed support rails, at least one walking beam between and generally parallel to the rails, and at least two lifters underneath the walking beam and operable to raise the walking beam from a return position generally below the rails to a conveying position generally above the rails. In accordance with the invention a first longitudinally extensible hydraulic actuator has opposite longitudinal ends one of which is secured relative to the rails. A second longitudinally extensible hydraulic actuator has opposite longitudinal one of which is secured to the other end of the first actuator and the other of which is secured to the walking beam. A controller connected to the lifters and actuators for, starting from a condition with the actuators both contracted longitudinally, raising the walking beam with the lifters to the conveying position and extending both the actuators to shift the walking beam downstream, and then lowering the walking beam with the lifters and contracting both of the actuators to shift the walking beam upstream.

Thus in other words a generic walking-beam conveyor of the species described in the introduction has a longitudinally effective actuator is designed as a double drive, for example (hydraulic) double-cylinder drive, comprising at least one first longitudinally effective actuator, for example a first cylinder, and at least one second longitudinally effective actuator movable by the first longitudinally effective actuator, for example, a second cylinder. The second cylinder is thus wholly movable by the first cylinder, and to this end is connected to the piston rod of the first cylinder. The piston rod of the second cylinder acts (indirectly or directly) on the walking beam. The invention is based on the knowledge that the possible applications for walking-beam conveyors can be significantly expanded if the system does not operate only with a single hydraulic cylinder, but if two or even more cylinders are serially, thereby significantly increasing the conveying distance achievable with a single conveying cycle.

In this regard, the invention recognizes that the piston stroke of a cylinder used for a walking-beam conveyor cannot in practice be increased without limits since there is the danger, for example, that an extremely long piston rod will bend. In contrast, the invention proposes that the system can operate with two or more cylinders that in terms of their design or dimensions can match the cylinders known per se such that the arrangement overall is especially stable. Nevertheless, a significantly increased conveying-step length can be covered with a single conveying cycle.

This not only has the advantage that a greater distance can be covered with a single conveying cycle; but additionally it is possible to dispose or transport the individual coils or the like on the walking-beam conveyor with increased spacing, for example, double spacing, with the result that for an overall comparable total loading of the walking-beam conveyor a significantly enlarged total conveying distance can be selected. The walking-beam conveyor according to the invention can thus also replace the chain conveyors frequently utilized in practice for long conveying distances. This is because in comparison with conventional walking-beam conveyors, a comparable number of coils can be distributed on a significantly enlarged, for example doubled, conveying line, with the result that a longer overall conveying distance is covered given the same stroke capacity. The two or more longitudinally effective actuators are especially preferably designed as (hydraulic) cylinders. However, the invention also comprises other types of drives, where the two or more "individual drives" are connected in series (in stepwise fashion).

The first cylinder is thus essentially stationary, although it may be pivoted. To this end, the first cylinder can be disposed fixedly or pivotably on a stationary bearing block. Connected to the piston rod of this first cylinder (for example, at the end) is the second cylinder that reciprocates moves completely upstream and downstream in response to actuation of the first cylinder. To this end, a carriage movable in the workpiece-travel direction can be connected to the piston rod of the first cylinder at its outer end, to which carriage the second cylinder is attached. During actuation of the first cylinder, the second cylinder is consequently moved as a whole downstream or upstream with the piston rod of the first cylinder along the workpiece-travel direction. The second cylinder is then itself also actuatable by the fact that its piston rod is retracted and extended, thereby contracting and extending the second actuator. Preferably, this piston rod of the second cylinder is attached at the end indirectly or directly to the walking beam. The invention also does includes an embodiment in which a third or even a fourth, or more cylinders are employed are connected in series, the piston rod of the last cylinder being connected to the walking beam.

In a preferred embodiment of the invention, the carriage to which the second cylinder is connected is movable along one or more guide rails. Within the scope of the invention, movable refers to a rolling and/or sliding motion. The cylinder carriage can thus be shift along the rails, for example, by rollers and/or on slide blocks.

In addition, the invention proposes that the piston rod of the second cylinder (or in the case of additional cylinders the piston rod of the last cylinder) is connected by at least one connecting piece to the walking beam. This piston rod can be pivotably connected to this connecting element or connecting piece. The invention is based here on the discovery that it is particularly effective to provide the entire longitudinally effective actuator along with its two cylinder piston arrangements below the actual walking-beam conveyor. This is so because the lifters of the walking-beam conveyor are movable in a manner known per se along guide rails extending in the workpiece-travel direction. It is then advantageous if the entire longitudinally effective actuator is disposed below these guide rails, the difference in level between the piston rod of the second cylinder and the walking beam being bridged by the preferably employed connecting piece. In this way, it is possible to make the design particularly compact, especially in the vertical dimension.

It is within the scope of the invention that the first cylinder and/or the second cylinder be designed as double-acting differential cylinders, such that both traction forces as well a pressure forces can be transmitted and the walking beam can be moved downstream and upstream along the workpiece-travel direction. The cylinder(s) here can be displacement-controlled.

It is furthermore within the scope of the invention that the first cylinder and the second cylinder be actuatable separately and/or jointly. In addition, it is possible for the first cylinder and the second cylinder to be actuated simultaneously. Advantageously, the invention is characterized overall by its flexible application. This is because insofar as the two cylinders are actuated sequentially, or also simultaneously, the above-described approach enables long travel distances to be attained, with the result that the desired loading with large longitudinal coil spacing can be selected. However, it is also within the scope of the invention that only one of the two cylinders, specifically either the first cylinder or the second cylinder, be actuated such that the system operates essentially "conventionally." The system then operates in a manner as known per se with the conventional or double loading of the walking beam. The given mode of operation can be adapted to the conditions. For example, it may be expedient to operate with only one cylinder and thus select a high loading of the walking beam if the purpose is to utilize the walking-beam conveyor essentially as a buffer or temporary storage.

The conveying stroke for the cylinders of walking-beam conveyors known from practice measures, for example, three to four meters. It is thus within the scope of the invention that the first cylinder and/or the second cylinder also provide this conveying stroke, with the result that overall when utilizing the two cylinders a doubled conveying stroke is generated. In this regard, the invention proposes that the conveying stroke of the first cylinder and/or of the second cylinder each be approximately between two meters and five meters, for example, between three meters and five meters, preferably, between three meters and four meters.

The walking-beam conveyor according to the invention is preferably employed as a conveyor for long conveyor lines. At the same time, it can be readily combined with other walking-beam conveyors or even conveyors of other species. For example, it may be expedient to connect a walking-beam conveyor according to the invention with double-cylinder drive to a walking-beam conveyor with a "simple" longitudinally effective actuator, in particular whenever coil processing is provided within the segment of this simple longitudinally effective actuator, while the walking-beam conveyor according to the invention with double-cylinder drive then functions to bridge large conveying distances.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
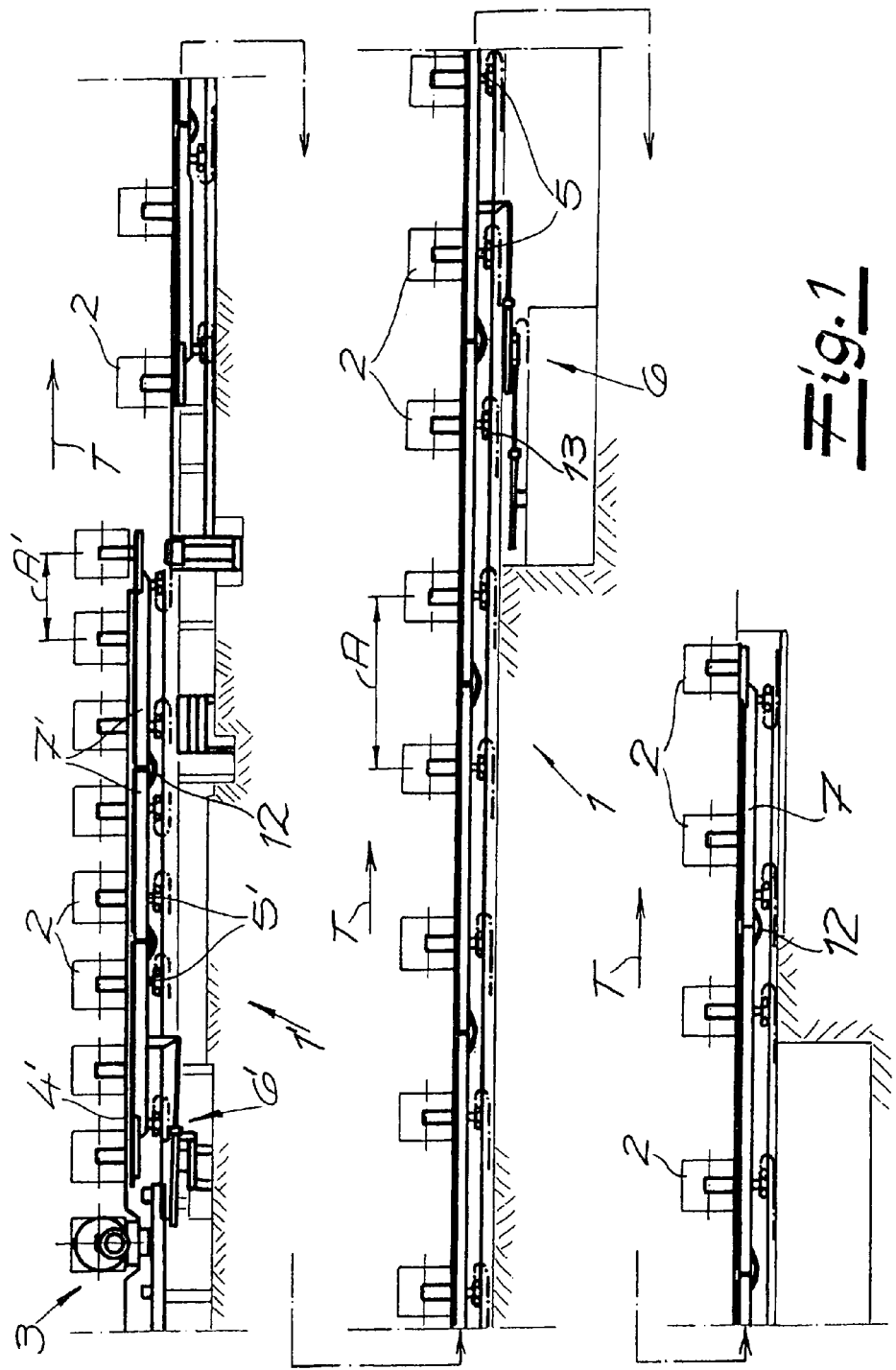
FIG. 1 is a schematic side view of a walking-beam conveyor according to the invention for use in or connected to a rolling mill.

As seen in FIG. 1 a walking-beam conveyor 1' is used as an intake device for a walking-beam conveyor 1 according to the invention for the step-wise advance of objects such as sheet-metal bundles or coils 2. The two conveyor form a transport or conveyor system that is connected to a rolling mill where strip, normally while still hot, is wound up into the coils 2 passed by a feeder 3 to the first walking-beam conveyor 1'. They are thence passed downstream in a transport direction T to the upstream (left-hand in the drawing) end of the second walking-beam conveyor 1 according to the invention 1 is connected.

Figure 2:
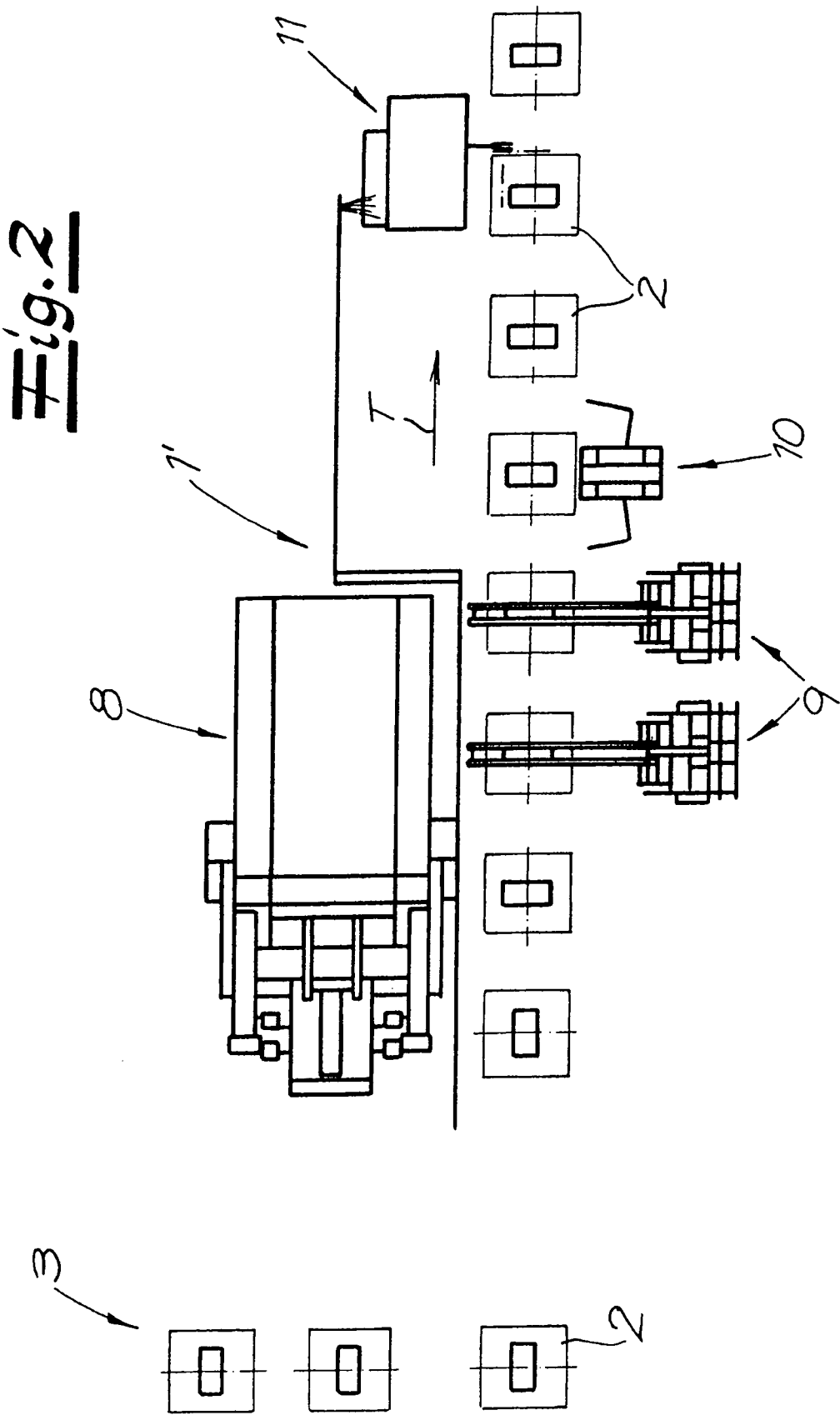
FIG. 2 is a top view of a portion of the conveyor shown in FIG. 1.

The upstream walking-beam conveyor 1' has multiple walking beams 7' that are raised and lowered between lateral support rails by lifters 5', and are movable as is standard in the prior art by a longitudinally effective actuator 6' in the longitudinal (here horizontal) workpiece-travel direction T. The longitudinally effective actuator 6' here of walking-beam conveyor 1' is designed in a manner known per se as a single hydraulic drive cylinder 6'. The step-wise movement downstream and upstream of the walking beams 7', as well as the corresponding lifting and lowering of the walking beams 7', enable the coils 2 resting on support rail 4' to be conveyed in the workpiece-travel direction T (from left to right). FIG. 2 here indicates that multiple processing stations are associated with this first walking-beam conveyor 1'—for example, an inspection device 8, a device for circumferential strapping, a device 10 for eye strapping, and optionally, a device 11 for marking the coils 2.

Connected at the end (and on the right in FIG. 1) to this (first) walking-beam conveyor 1' with conventional longitudinally effective actuator 6' is the (second) walking-beam conveyor 1 according to the invention for the cyclic (further) conveyance of the coils 2. It is evident that this walking-beam conveyor 1 functions to bridge a large conveying distance, and to this end is composed of a plurality of longitudinally extending and succeeding walking beam 7 (seven sections in the embodiment). Individual walking beams 7 are interconnected by U-shaped links 12 such that they are always moved downstream or upstream jointly, yet are raised or lowered either separately or jointly, that is sequentially in unison. To this end, at least two lifters 5 each are associated with each individual walking beam 7, the lifters being designed in the embodiment as hydraulic lifting cylinders 5. Respective carriages 13 support the lifters 5 and in turn slide and/or roll on guide rails 14 extending in the workpiece-travel direction T.

The fixed lateral support rails 4 are formed by one or more pieces that extend either continuously or as a longitudinally succeeding row of sections over the entire conveying distance. Lifting one or more walking beams 7 enables one or more the coils 2 to be lifted off the support rails 4. Subsequently, the walking beams 7 can then be advanced together with the coils 2 in the transport direction T by a predetermined extent. Lowering the walking beams 7 then enables the coils 2 to be lowered at the essentially advanced position onto support rails 4. Subsequently, the walking beams 7 can be retracted by longitudinally effective actuator 6 to the starting position, thereby enabling the coils 2 to be conveyed further in a subsequent cycle.

Figure 3:
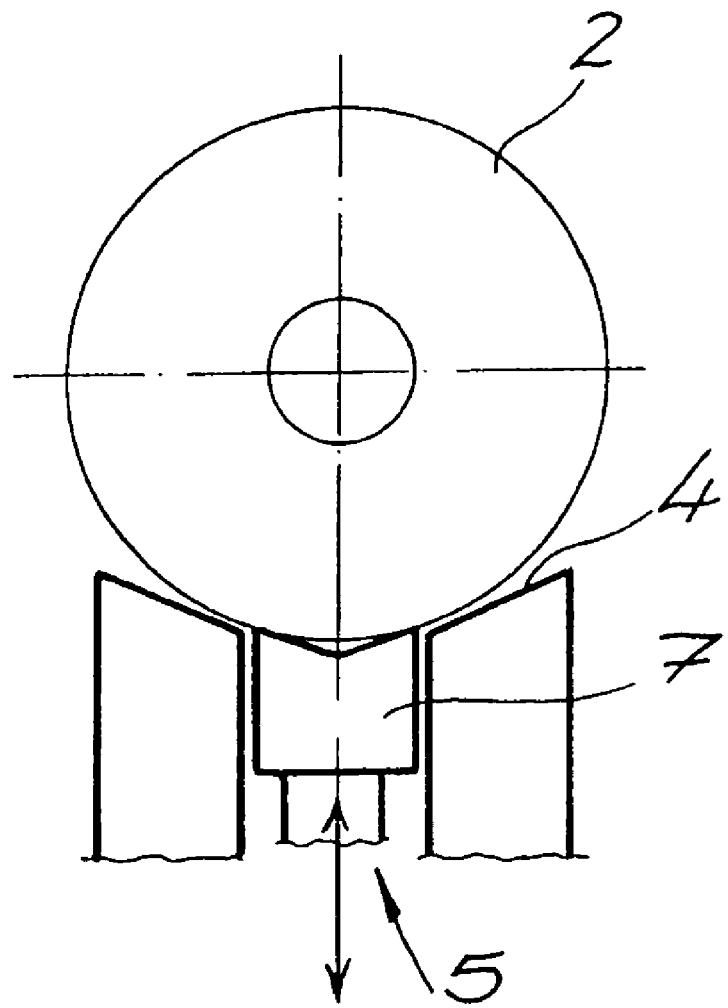
FIG. 3 is a simplified cross-section of a walking-beam conveyor.

FIG. 3 shows how the walking-beam conveyor 1 can be designed as a so-called trough-type walking-beam conveyor in which the walking beam 7 or the traveling beam is upwardly concave, that is with a U-shaped upper surface. The lateral support rails 4 are of a cambered design with an inclined top face. However, the invention can be applied to all types of walking-beam conveyors—for example, troughed walking beams, humped walking beams, plate walking beams, but also to additional embodiments that are developed as a function of the product.

Figure 4:
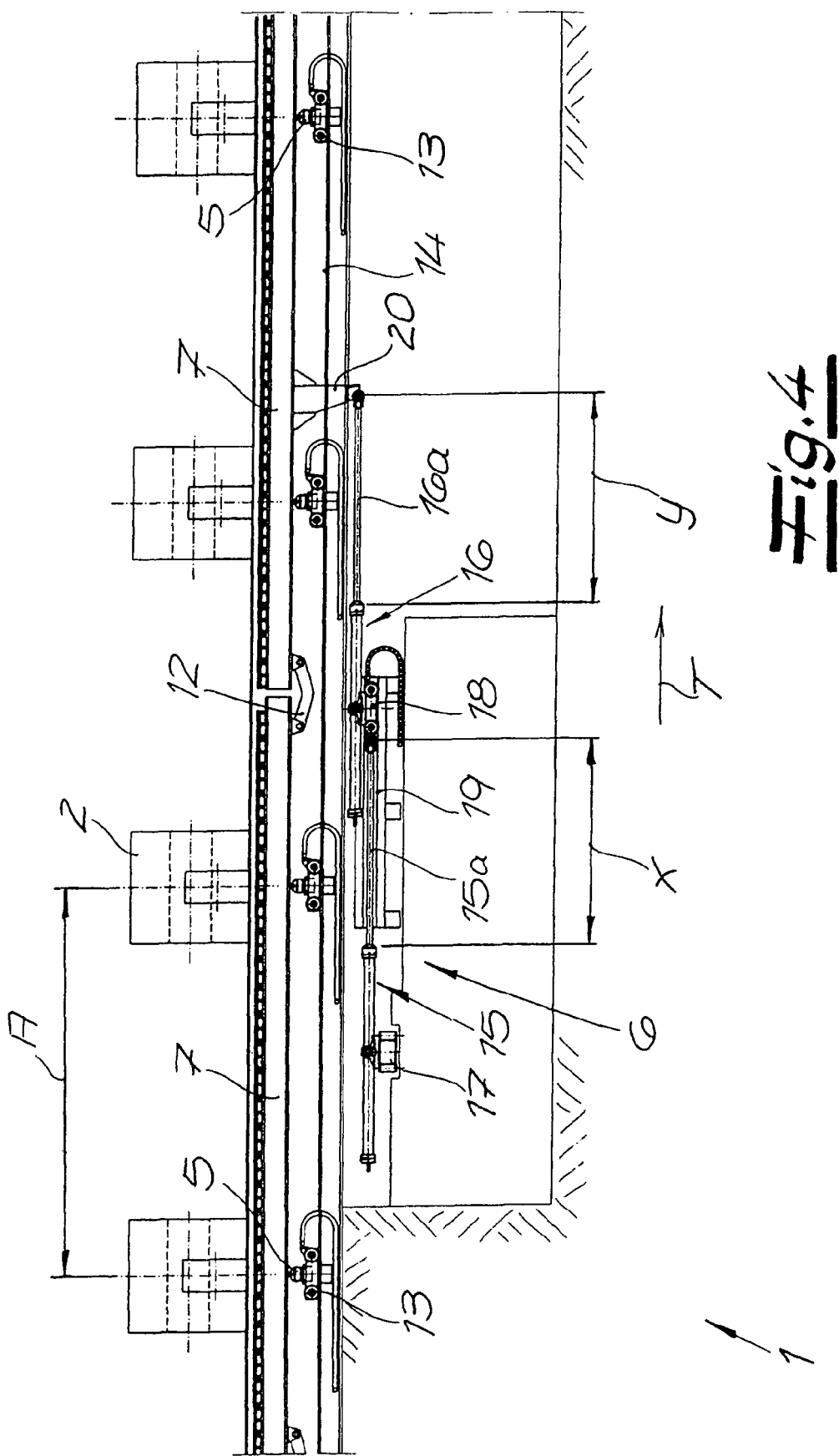
FIG. 4 is an enlarged section of the object of FIG. 1.

FIG. 4, in particular, makes clear that longitudinally effective actuator 6 of walking-beam conveyor 1 according to the invention is a hydraulic double-cylinder drive, and to this end it has both a first cylinder 15 and also a second cylinder 16 that is movable by first cylinder 16 along workpiece-travel direction T. The second cylinder 16 is thus movable relative to first cylinder 15, and to this end is connected to a piston rod 15a of the first cylinder 15. The piston rod 16a of the second cylinder 16 in turn acts on the walking beams 7. To this end, FIG. 4 indicates that the first cylinder 15 mounted stationary, although it could pivot about an axis 16A to which the rails 4 are fixed, on a bearing block 17 fixed to a fixed base 21.

FIG. 4 shows the first-cylinder piston rod 15a completely extended. Here, a travel stroke x of the first cylinder 15 is approximately 3.5 to 4 meters. Connected at the outer end of this piston rod 15a is a carriage 18 that can roll or slide on one or more cylinder guide rails 15. A second cylinder 16 is fixed to the carriage 18 such that during actuation of the first cylinder 15, and thus during the retraction and extension of the first piston rod 15a, the entire second cylinder 16 together with piston rod 15a of the first cylinder 15 can move upstream and downstream. Independently thereof, a piston rod 16a of the second cylinder 16 is retractable and extendable. Here the travel stroke y of the second cylinder is also 3.5 to 4 meters. The cylinder 16 is pivoted at axis 18A on the carriage 18.

The end of the piston rod 16a of the second cylinder 16 is connected to the walking beam 7, specifically via a depending arm forming a connecting element 20. FIG. 4 indicates that the piston rod 16a of the second cylinder 16 can be pivoted at 20A at the end of the rod to this connecting element 20. The axes 16A, 18A, and 20A are all parallel, horizontal, and perpendicular to the direction T.

Comparison of FIGS. 1 and 4 makes clear that all the walking beams 7 of walking-beam conveyor 1 can be moved along the workpiece-travel direction T by the actuation of the first cylinder 15 and/or of the second cylinder 16. In this regard, it is possible for a controller 22 to actuate the two cylinders 15 and 16 either separately or jointly. In addition, it is possible for the two cylinders 15, 16 to be actuated simultaneously. In this case of simultaneous actuation of both the first cylinder 15 and the second cylinder 16, the walking beams 7 can be conveyed in a single cycle by essentially a double conveying stroke (x+y), and specifically in the same cycle time as compared with a single longitudinally effective actuator with a single cylinder. The double conveying stroke (x+y) also produces an increased distance (A=x+y) between individual coils 2 on the walking beams or on the bearing beams. This comes directly from a comparative examination of coil distance A in the region of walking-beam conveyor 1 according to the invention with distance A' of the coils 2 in the first walking-beam conveyor 1' shown on the left in FIG. 1, in which the system operates only with a single conventional cylinder 6'.

FIG. 1 shows the second walking-beam conveyor 1 in a preferred mode of operation that functions to bridge the greatest possible conveying distances. In this case, both cylinders 15 and 16 are always actuated, thereby producing the described double conveying strokes per cycle that are associated with the large distance A shown in FIG. 1 between the coils 2. However, it is optionally also possible during transport with the walking-beam conveyor 1 to employ only one of longitudinally effective actuators 15 or 16—for example, only the first longitudinally effective actuator 15, or also only the second longitudinally effective actuator 16. In this type of operational mode, the walking beam 7 is moved per cycle only by the conveying stroke x or y of this one cylinder 15 or 16, with the result that coil 2 resting on the walking beam 7 is also conveyed only by this conveying stroke x or y. As a result, it is now possible to run the walking-beam conveyor with a higher load, for example, a double load. Such a mode of operation is not shown in FIG. 1.

FIG. 4 otherwise indicates that the entire longitudinally effective actuator 6, composed of the first cylinder 15 and the second cylinder 16, is below the guide rails 14 for the lifters 5. The level difference between the piston rod 16a of the second cylinder 16 and the bottom face of the walking beam 7 is compensated for by the connecting element 20, already described above, which in the embodiment is oriented essentially vertically.

Of particular significance within the scope of the invention is the fact that the flexibility of the walking-beam conveyor 1 according to the invention allows for a precise adaptation of operation to the existing conditions. Consequently, if coils of high weight are being produced, the invention recommends that the system operate using both cylinders 15 and 16 with "single" loading, and thus with large coil spacing. If, conversely, coils 2 of low weight are being produced, then it is possible within the scope of the invention to operate the walking-beam conveyor 1 with essentially double loading, that is half spacing between longitudinally succeeding objects. This is also useful due to the fact that coils of low weight are regularly also produced with relatively rolling short times, with the result that the coils must then be fed, and thus conveyed further, with a short cycle time.

Another advantageous application of walking-beam conveyor 1 according to the invention involves combining such a walking-beam conveyor 1 with a car conveyor as known per se. The increased conveying stroke enables the conveying cars as known per se to be loaded, for example, simultaneously with two coils very quickly, thereby providing especially efficient car conveyance. This possibility is not shown in the figures.

The walking-beam conveyor according to the invention can be employed in connection with all types of rolling mills and processing lines, such as pickling lines, surface coating equipment, shearing lines, conveyance systems connecting various equipment, etc. They can be employed both at the input (feed for the coils) as well as at the output (removal section for the coils). In addition, the walking-beam conveyor according to the invention can function as an intermediate conveyor for intermediate conveyance between various pieces of equipment. The walking-beam conveyors according to the invention are suitable for hot and cold products, for example, hot and cold coils.

We claim:

1. A walking-beam conveyor comprising:
    a pair of horizontal, longitudinally extending, parallel, and transversely spaced fixed support rails;
    a walking beam between and generally parallel to the rails;
    an upper horizontally and longitudinally extending guide;
    at least two lifters underneath the walking beam, supported on and movable longitudinally along the upper guide, and operable to raise the entire walking beam from a return position generally below the rails to a conveying position generally above the rails;
    a first longitudinally extensible hydraulic actuator having a first cylinder defining one longitudinal cylinder end and a piston slidable longitudinally in the first cylinder and defining an opposite longitudinal piston end;
    means anchoring the cylinder end relative to the rails;
    a second longitudinally extensible hydraulic actuator having a second cylinder defining one longitudinal cylinder end and a piston defining an opposite longitudinal piston end;
    a lower horizontally and longitudinally extending guide below the upper guide;
    means supported on and movable longitudinally along the lower guide for securing the cylinder end of the second actuator directly to the piston end of the first actuator;
    means securing the piston end of the second actuator to the walking beam, the beam extending over the actuators and longitudinally in one direction past the piston end of the second actuator and longitudinally in an opposite direction past the cylinder end of the first actuator; and
    control means connected to the lifters and actuators for, starting from a condition with the actuators both contracted longitudinally, raising the entire walking beam with the lifters to the conveying position and extending both the actuators to shift the entire walking beam downstream, and then lowering the entire walking beam with the lifters and contracting both of the actuators to shift the entire walking beam upstream.

2. The walking-beam conveyor defined in claim 1 wherein the first cylinder is pivotal about a horizontal axis transverse to the direction.

3. The walking-beam conveyor defined in claim 1, further comprising
    a carriage reciprocal in the transport direction on the lower guide and connected by the first-mentioned securing means to the first-actuator piston rod and second cylinder.

4. The walking-beam conveyor defined in claim 3 wherein the second-mentioned securing means includes a pivot between the second-actuator piston rod and the walking beam.

5. The walking-beam conveyor defined in claim 4 wherein the first-mentioned securing means includes a pivot connecting the second cylinder to the carriage.

6. The walking-beam conveyor defined in claim 5 wherein the pivots are effective about respective pivot axes both extending horizontally transversely of the direction.

7. The walking-beam conveyor defined in claim 3 wherein the anchoring means fixes the first cylinder against any substantial longitudinal movement relative to the rails.

8. The walking-beam conveyor defined in claim 3, further comprising:
    respective lifter carriages on the upper guide and carrying the lifters.

9. The walking-beam conveyor defined in claim 1 wherein at least one of the cylinders is a double-acting hydraulic differential cylinder.

10. The walking-beam conveyor defined in claim 1 wherein the control means expands the cylinders simultaneously.

11. The walking-beam conveyor defined in claim 1 wherein the walking beam has a plurality of longitudinally extending sections each of which is supported on at least two of the lifters and one of which is secured by the second securing means to the second cylinder, the conveyor further comprising:
    links pivoted at joints between longitudinally succeeding beam sections.

12. The walking-beam conveyor defined in claim 11 wherein each link extends longitudinally, is U-shaped and upwardly open, and has an upstream and downstream ends pivoted about a horizontal pivot axes on the longitudinally flanking beam sections.

13. A walking-beam conveyor comprising:
    a pair of horizontal, longitudinally extending, parallel, and transversely spaced fixed support rails;
    a walking beam between and generally parallel to the rails;
    an upper horizontally and longitudinally extending guide;
    at least two lifters underneath the walking beam, supported on and movable longitudinally along the upper guide, and operable to raise the entire walking beam from a return position generally below the rails to a conveying position generally above the rails;
    a first longitudinally extensible hydraulic actuator having opposite longitudinal ends;

means anchoring one of the longitudinal ends relative to the rails;

a second longitudinally extensible hydraulic actuator having opposite longitudinal ends;

a lower horizontally and longitudinally extending guide below the upper guide;

means securing one of the ends of the second actuator to the other end of the first actuator; and means supported on and movable longitudinally along the lower guide for securing the other end of the second actuator to the walking beam; and control means connected to the lifters and actuators for, starting from a condition with the actuators both contracted longitudinally, raising the entire walking beam with the lifters to the conveying position and simultaneously extending both the actuators to shift the walking beam downstream, and then lowering the entire walking beam with the lifters and simultaneously contracting both of the actuators to shift the walking beam upstream.

14. A walking-beam conveyor comprising:

a pair of horizontal, longitudinally extending, parallel, and transversely spaced fixed support rails;

a walking beam between and generally parallel to the rails;

an upper horizontally and longitudinally extending guide;

at least two lifters underneath the walking beam, supported on and movable longitudinally along the upper guide, and operable to raise the entire walking beam from a return position generally below the rails to a conveying position generally above the rails;

a first longitudinally extensible hydraulic actuator having opposite longitudinal ends;

means anchoring one of the longitudinal ends relative to the rails and fixing the first actuator against any substantial movement relative to the rails;

a second longitudinally extensible hydraulic actuator having opposite longitudinal;

means for securing one of the ends of the second actuator to the other end of the first actuator; and means securing the other end of the second actuator to the walking beam;

control means connected to the lifters and actuators for, starting from a condition with the actuators both contracted longitudinally, raising the entire walking beam with the lifters to the conveying position and extending both the actuators to shift the walking beam downstream, and then lowering the entire walking beam with the lifters and contracting both of the actuators to shift the walking beam upstream;

a lower longitudinally extending guide underneath the rails, the upper guide, and the walking beam and extending in the travel direction; and a carriage reciprocal in the transport direction on the guide and connected by the first securing means to the first-actuator piston rod and second actuator.

* * * * *